(12) United States Patent  (10) Patent No.: US 7,328,441 B2
Tsao  (45) Date of Patent: Feb. 5, 2008

(54) OPTICAL DISC DRIVE

(75) Inventor: Ming-Chun Tsao, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 407 days.

(21) Appl. No.: 11/160,559

(22) Filed: Jun. 29, 2005

(65) Prior Publication Data

US 2006/0212887 A1  Sep. 21, 2006

(30) Foreign Application Priority Data

Mar. 21, 2005 (TW) ............... 94108553 A

(51) Int. Cl.
*G11B 17/04* (2006.01)

(52) U.S. Cl. ............ 720/613; 720/601; 720/602; 720/610

(58) Field of Classification Search ........... 720/601, 720/602, 610, 613
See application file for complete search history.

(56) References Cited

U.S. PATENT DOCUMENTS

| 6,151,285 | A | * | 11/2000 | Watanabe et al. | ........... 720/610 |
| 6,392,975 | B2 | * | 5/2002 | Arai | ............ 720/610 |
| 7,020,884 | B2 | * | 3/2006 | Choi et al. | ........... 720/613 |
| 7,140,029 | B2 | * | 11/2006 | Chiou et al. | ........... 720/613 |
| 2005/0050560 | A1 | * | 3/2005 | Nishide | ........... 720/610 |

FOREIGN PATENT DOCUMENTS

| JP | 02096971 A | * | 4/1990 |
| JP | 02096974 A | * | 4/1990 |
| JP | 09231650 A | * | 9/1997 |
| JP | 09237454 A | * | 9/1997 |
| JP | 2000011508 A | * | 1/2000 |
| JP | 2005050432 A | * | 2/2005 |
| JP | 2005071420 A | * | 3/2005 |

* cited by examiner

*Primary Examiner*—William J Klimowicz
(74) *Attorney, Agent, or Firm*—Jianq Chyun IP Office

(57) ABSTRACT

An optical disc drive with a positioning mechanism suitable for reading data from an optical disc is provided. The optical disc drive comprises a casing, a tray, a reading module and a rail. The tray is disposed inside the casing. The tray has a first positioning part and is suitable for withdrawing from the casing. The reading module is disposed on the tray and is suitable for reading data from an optical disc. The rail is disposed inside the casing and is suitable for withdrawing from the casing when driven by the tray. The rail has a second positioning part. When the tray is ejected from the casing, the location of the tray relative to the casing is maintained through the first positioning part and the second positioning part. Therefore, an optical disc can be put on the tray or removed from the tray with ease.

8 Claims, 6 Drawing Sheets

OPTICAL DISC DRIVE

CROSS-REFERENCE TO RELATED APPLICATION

This application claims the priority benefit of Taiwan application serial no. 94108553, filed on Mar. 21, 2005. All disclosure of the Taiwan application is incorporated herein by reference.

BACKGROUND OF THE INVENTION

1. Field of the Invention

The present invention relates to an optical disc drive. More particularly, the present invention relates to an optical disc drive having a positioning mechanism therein.

2. Description of the Related Art

Because optical discs are cheap, sturdy, easy to carry and store and can store vast quantities of data for a long time with a minimal chance of damage, optical discs have gradually replaced other conventional magnetic storage media to become the preferred medium. Due to the widespread use of optical discs, optical disc drives for reading data from the optical discs have become one of the essential electronic products in out daily life.

FIG. 1 is a perspective view of a conventional optical disc drive. FIG. 2 is a perspective view showing the interior of the casing shown in FIG. 1. As shown in FIG. 1 and FIG. 2, a conventional optical disc drive 100 mainly comprises a casing 110, a tray 120, a reading module 130, a rail 140, a control circuit board 150 and a flexible printed circuit 160. The reading module 130 is disposed on the tray 120. Furthermore, the reading module 130 has a turntable 131 and an optical pick-up 133 disposed on the tray 120. The control circuit board 150 is disposed inside the casing 110 and the flexible printed circuit 160 connects the reading module 130 with the control circuit board 150.

As shown in FIGS. 1 and 2, when the data on a particular optical disc needs to be read, the optical disc is placed on the tray 120 such that the center of the disc is firmly mounted on the turntable 131. Thereafter, the tray 120 is pushed into the casing 110 guided by the rail 140. When the user initiate the reading operation, the turntable 131 will rotate the optical disc and then the optical pick-up 133 will move along a track-seeking path to read the data. As the optical pick-up 133 reads data from the optical disc, the control circuit board 150 also controls the operation of the turntable 131 and the optical pick-up 133 and receives the data signals from the optical pick-up 133 through the flexible printed circuit 160.

However, the tension on the tray 120 due to the bending and extension of the flexible printed circuit 160 when the tray 120 is fully withdrawn from the casing along the rail 140 may cause a slight retraction of the tray 120 into the casing 110. Such retraction may interfere with the process of putting an optical disc on the tray or removing an optical disc from the tray and hence inconvenience the user.

SUMMARY OF THE INVENTION

The present invention is directed to provide an optical disc drive with a positioning mechanism capable of maintaining a tray at a proper location after the tray has been ejected from a casing.

As embodied and broadly described herein, the invention provides an optical disc drive having a positioning mechanism suitable for reading the data from an optical disc. The optical disc drive comprises a casing, a tray, a reading module and a rail. The tray is disposed inside the casing. The tray has a first positioning part and is suitable for withdrawing from the casing. The reading module is disposed on the tray and is suitable for reading data from an optical disc. The rail is disposed inside the casing and is suitable for withdrawing from the casing when driven by the tray. The rail has a second positioning part. When the tray is ejected from the casing, the location of the tray relative to the casing is maintained through the first positioning part and the second positioning part.

According to one embodiment of the present invention, the first positioning part is a protrusion and the second positioning part is a recess or a hole, for example.

According to one embodiment of the present invention, the first positioning part is a recess or a hole and the second positioning part is a protrusion, for example.

According to one embodiment of the present invention, the first positioning part and the second positioning part are protrusions, for example.

According to one embodiment of the present invention, the optical disc drive further comprises a control circuit board and a flexible printed circuit. The control circuit board is disposed inside the casing and the flexible printed circuit connects the reading module with the control circuit board.

According to one embodiment of the present invention, the reading module further comprises a turntable and an optical pick-up. The turntable is disposed on the tray for gripping and spinning the optical disc. The optical pick-up is disposed on the tray for moving along a track-seeking path and read data from the optical disc.

According to one embodiment of the present invention, the rail comprises an outer rail and an inner rail. The outer rail is disposed inside the casing and the inner rail forms a sliding engagement with the outer rail 243. The tray also forms a sliding engagement with the inner rail.

According to one embodiment of the present invention, the tray has an arm such that the first positioning arm is located on the arm.

Accordingly, the present invention utilizes the latching of the first positioning part on the tray with the second positioning part on the rail to maintain a constant separation between tray and the casing after the tray is completely withdrawn from the casing. Thus, the pull on the tray due to the bending and extension of the flexible printed circuit can be cancelled out so that optical disc exchange is facilitated.

It is to be understood that both the foregoing general description and the following detailed description are exemplary, and are intended to provide further explanation of the invention as claimed.

BRIEF DESCRIPTION OF THE DRAWINGS

The accompanying drawings are comprised to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
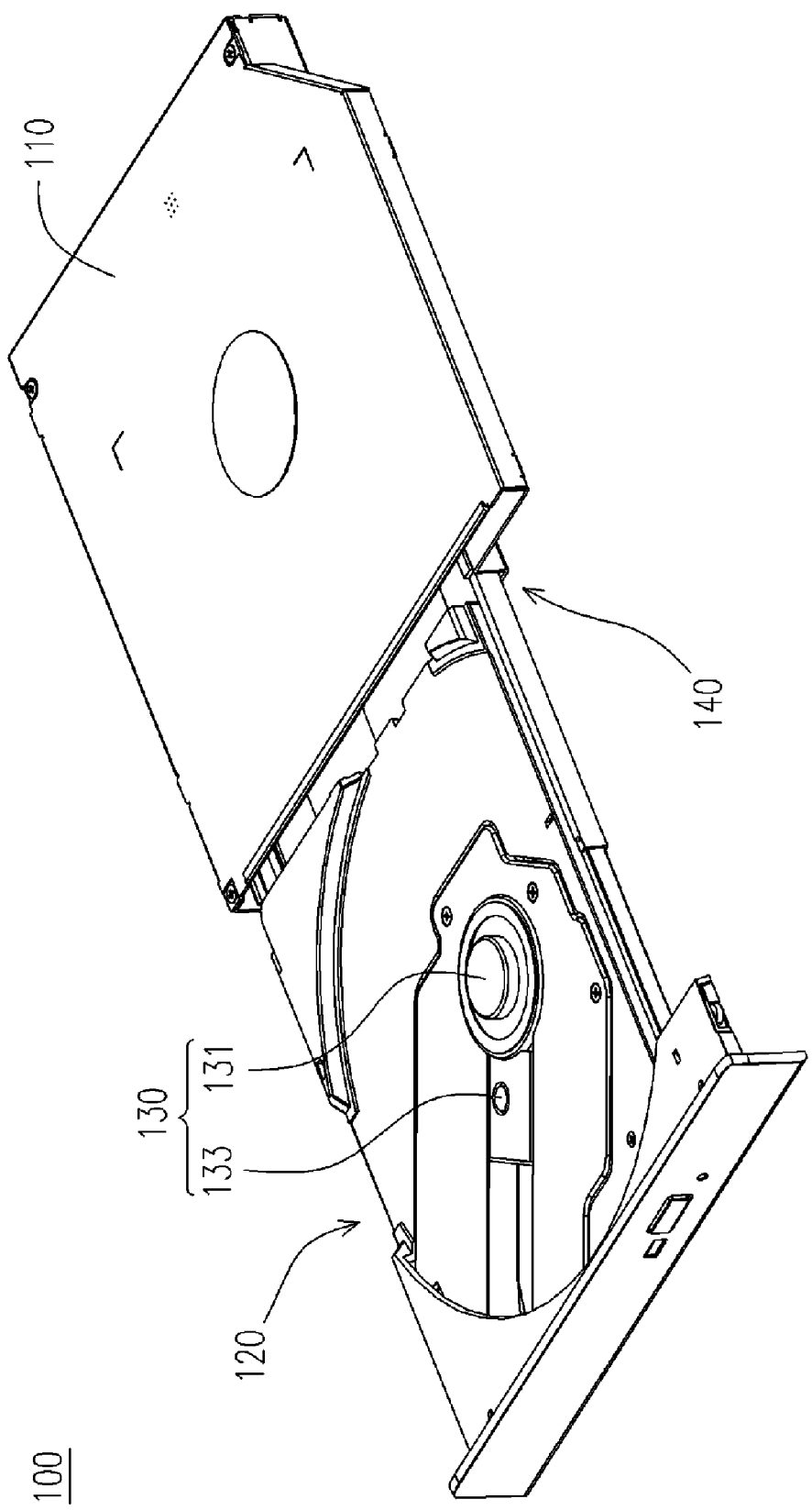
FIG. 1 is a perspective view of a conventional optical disc drive.
Figure 2:
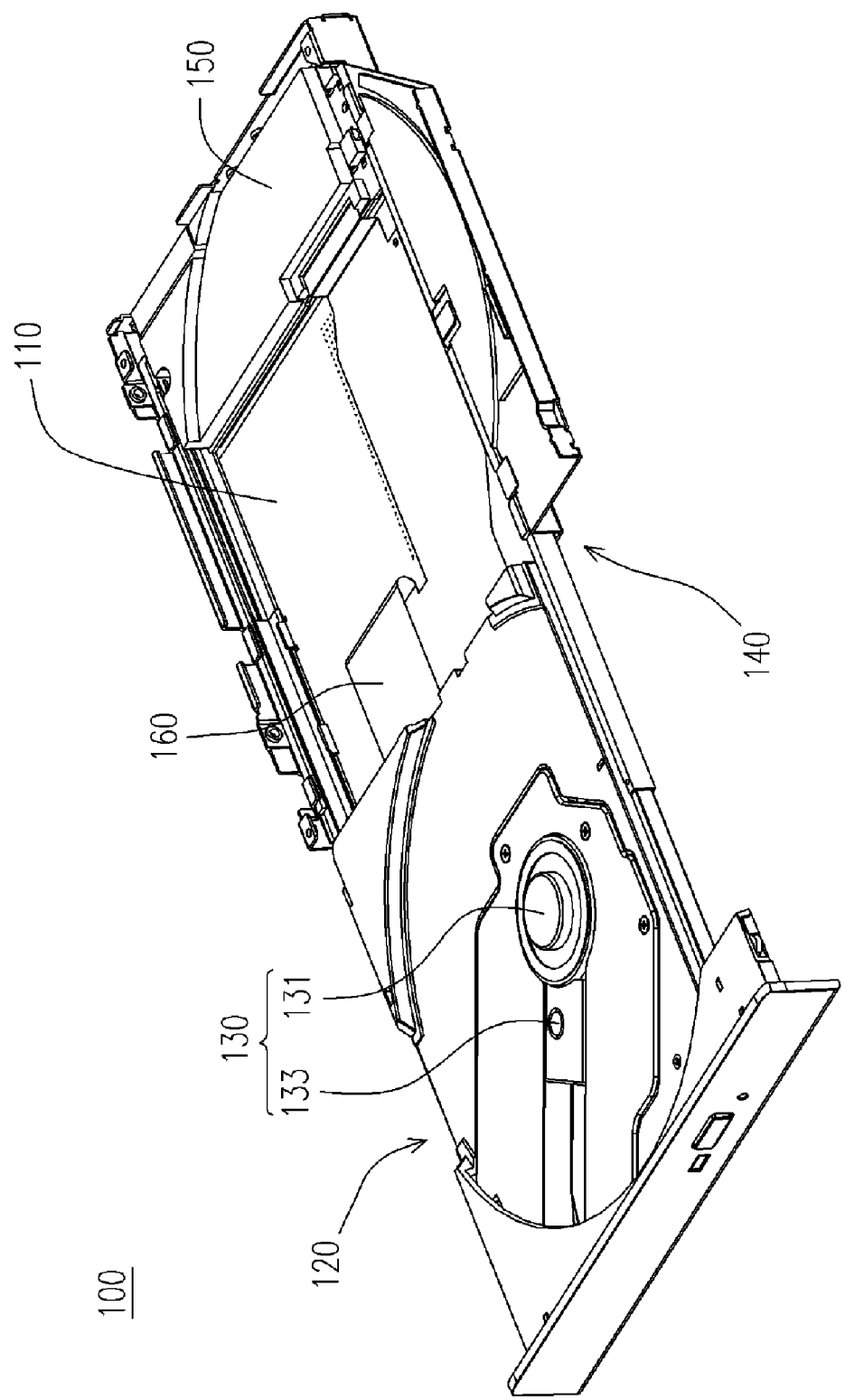
FIG. 2 is a perspective view showing the interior of the casing in FIG. 1.

Reference will now be made in detail to the present preferred embodiments of the invention, examples of which are illustrated in the accompanying drawings. Wherever possible, the same reference numbers are used in the drawings and the description to refer to the same or like parts.

Figure 3:
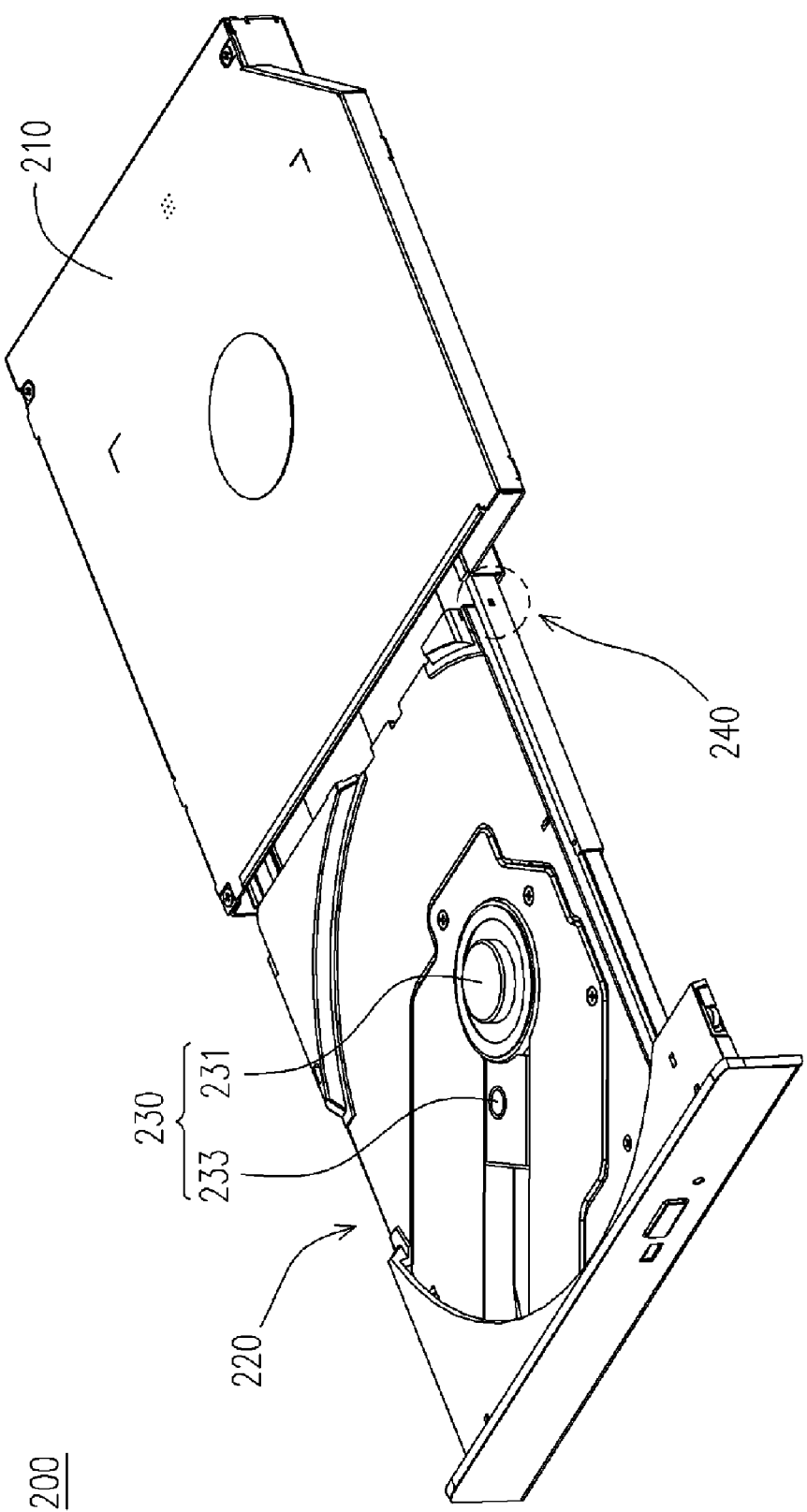
FIG. 3 is a perspective view of an optical disc drive according to a first embodiment of the present invention.
Figure 4:
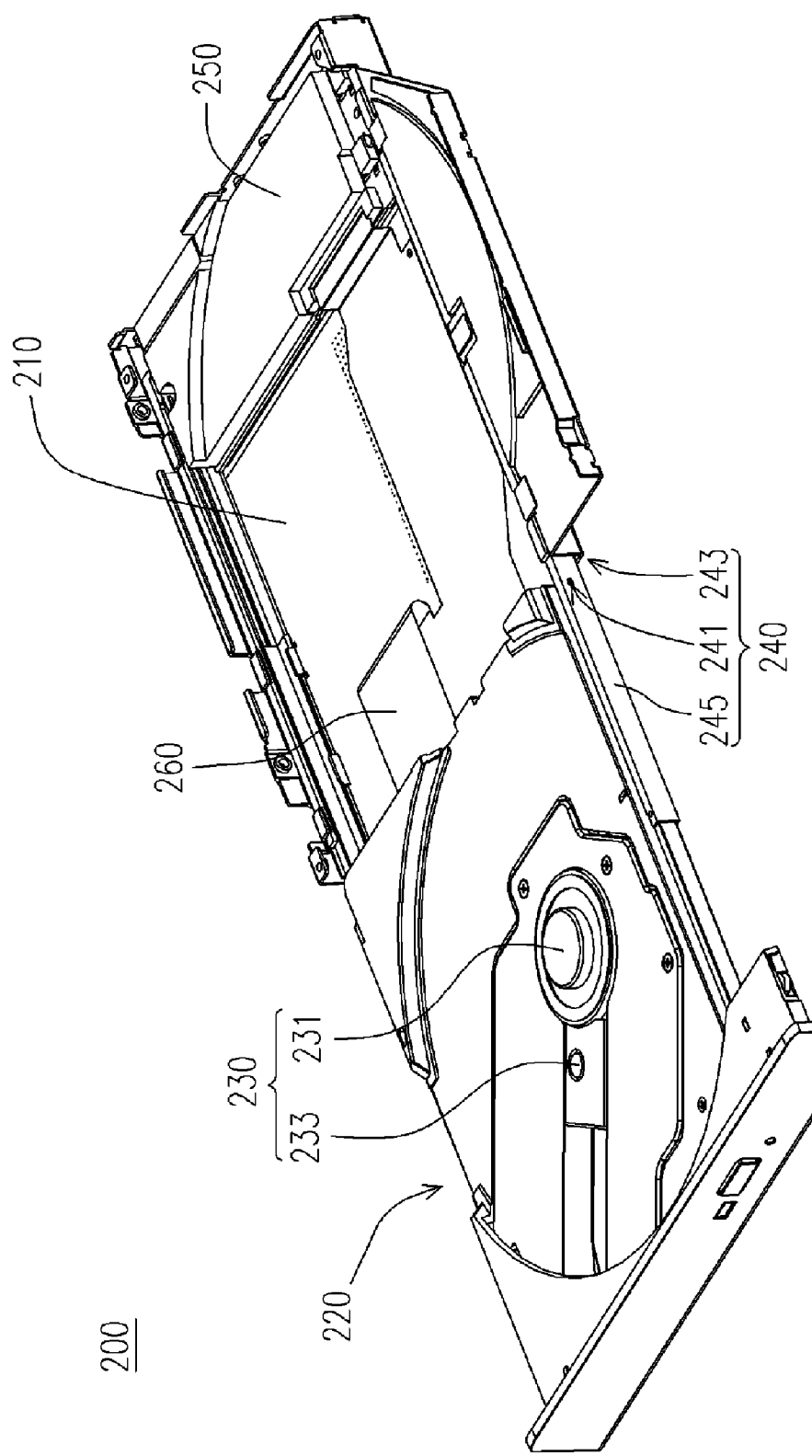
FIG. 4 is a perspective view showing the interior of the casing in FIG. 3.
Figure 5:
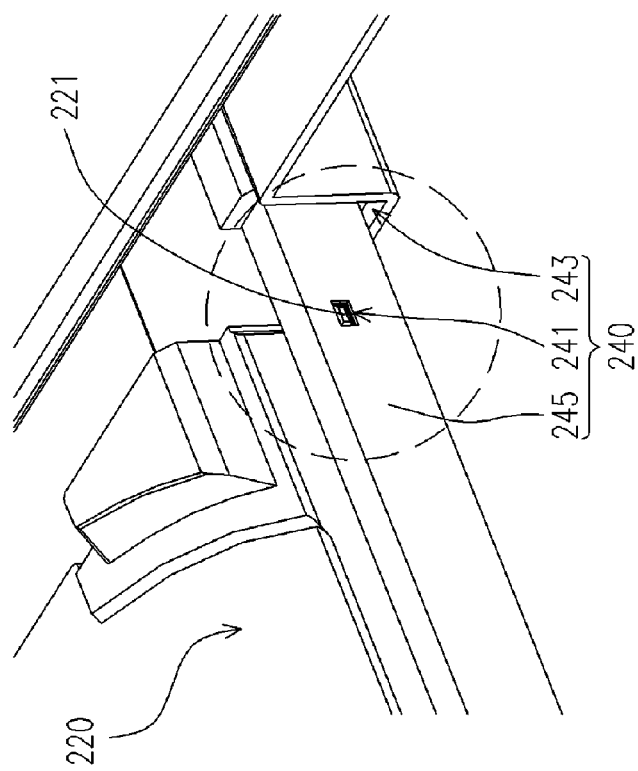
FIG. 5 is a locally magnified perspective view showing the tray and the rail in FIG. 3.

FIG. 3 is a perspective view of an optical disc drive according to a first embodiment of the present invention. FIG. 4 is a perspective view showing the interior of the casing in FIG. 3. FIG. 5 is a locally magnified perspective view showing the tray and the rail in FIG. 3. As shown in FIGS. 3, 4 and 5, an optical disc drive 200 suitable for reading data from an optical disc is provided. The optical disc drive 200 mainly comprises a casing 210, a tray 220, a reading module 230 and a rail 240. The tray 220 is disposed inside the casing 210. The tray 220 has a first positioning part 221 (a protrusion as shown in FIG. 5). Furthermore, the tray 220 is suitable for ejecting from the casing 210. The reading module 230 is disposed on the tray 220 and is suitable for reading data from the optical disc.

The rail 240 is disposed within the casing 210 and is suitable for withdrawing from the casing 210 when driven by the tray 220. The rail 240 has a second positioning part 241 (a hole in FIG. 5, however the second positioning part 241 can also be a recess). When the tray 220 is ejected from the casing 210, the position of the tray 220 relative to the casing 210 is maintained through the first positioning part 221 and the second positioning part 241.

As shown in FIG. 4, the optical disc drive 200 in the present invention further comprises a control circuit board 250 and a flexible printed circuit 260. The control circuit board 250 is disposed inside the casing 210 and the flexible printed circuit 260 connects the reading module 230 with the control circuit board 250. The reading module 230 further comprises a turntable 231 and an optical pick-up 233. The turntable 231 is disposed on the tray 220 for gripping and spinning an optical disc. The optical pick-up 233 is also disposed on the tray 220 and is suitable for moving along a track-seeking path to read data from the optical disc.

Figure 6:
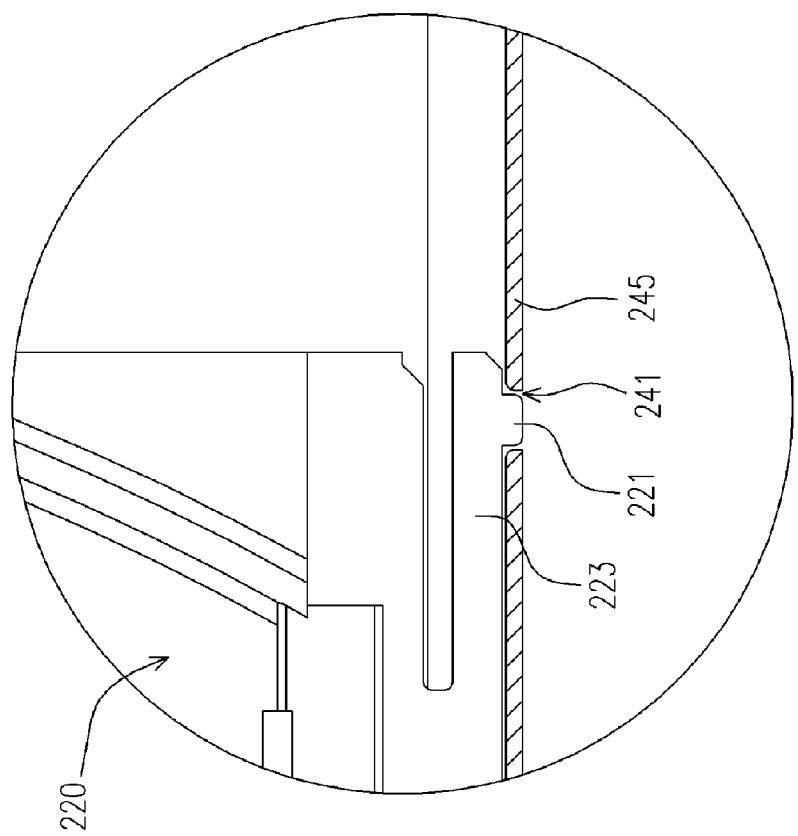
FIG. 6 is a locally magnified top cross-sectional view of FIG. 5.

As shown in FIGS. 4 and 5, the rail 240 comprises an outer rail 243 and an inner rail 245, for example. The outer rail 243 is disposed inside the casing 210 and the inner rail 245 forms a sliding engagement with the outer rail 243. Furthermore, the tray 220 forms a sliding engagement with the inner rail 245. FIG. 6 is a locally magnified top cross-sectional view of FIG. 5. The tray 220 may comprise an arm 223 such that the first positioning part 221 is located on the arm 223.

In the following, the operation of the optical disc drive 200 is described in detail. As shown in FIGS. 3, 4, 5 and 6, when the tray 220 is ejected from the casing 210, the tray 220 slides out from the inner rail 245 while the inner rail 245 slides out from the outer rail 243. Because the first positioning part 221 of the tray 220 is located on the arm 223, the first positioning part 221 has some degree of elasticity for latching onto the second positioning part 241 on the rail 240. Thus, the tension on the tray 220 that pulls the tray 220 toward the interior of the casing along the rail due to the bending and extension of the flexible printed circuit 260 is canceled out. Consequently, the position of the tray 220 relative to the casing 210 is maintained through the first positioning part 221 and the second positioning part 241 so that optical disc loading and/or unloading is facilitated.

It should be noted that the first positioning part 221 is a protrusion and the second positioning part 241 is a recess or hole as shown in FIG. 6. However, any first positioning part 221 and second positioning part 241 having a matching design that can latch onto each other can be used. Hence, the aforementioned embodiment is used as an illustration only and is not used to limit the scope of the present invention.

Figure 7:
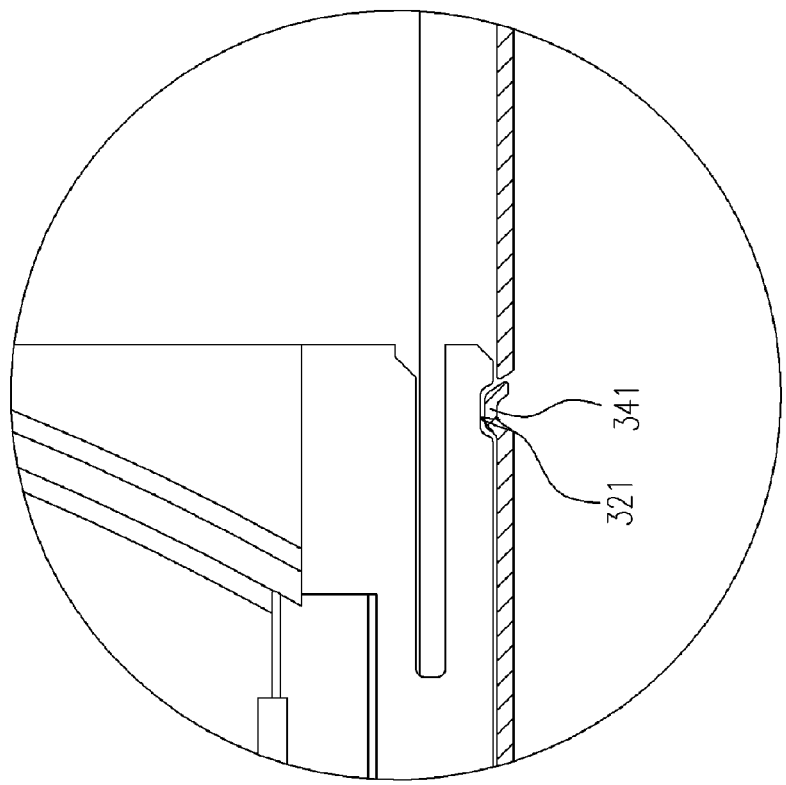
FIG. 7 is a top view showing the latching between the first positioning part and the second positioning part in the optical disc drive according to a second embodiment of the present invention.

FIG. 7 is a top view showing the latching between the first positioning part and the second positioning part in the optical disc drive according to a second embodiment of the present invention. As shown in FIG. 7, the first positioning part 321 can be a recess or a hole and the second positioning part 341 can be a protrusion. In addition, the size, location, shape, quantity of the aforementioned recess, hole and protrusion depends on product requirements. Hence, no special restrictions are laid down in these areas in the present invention.

Figure 8:
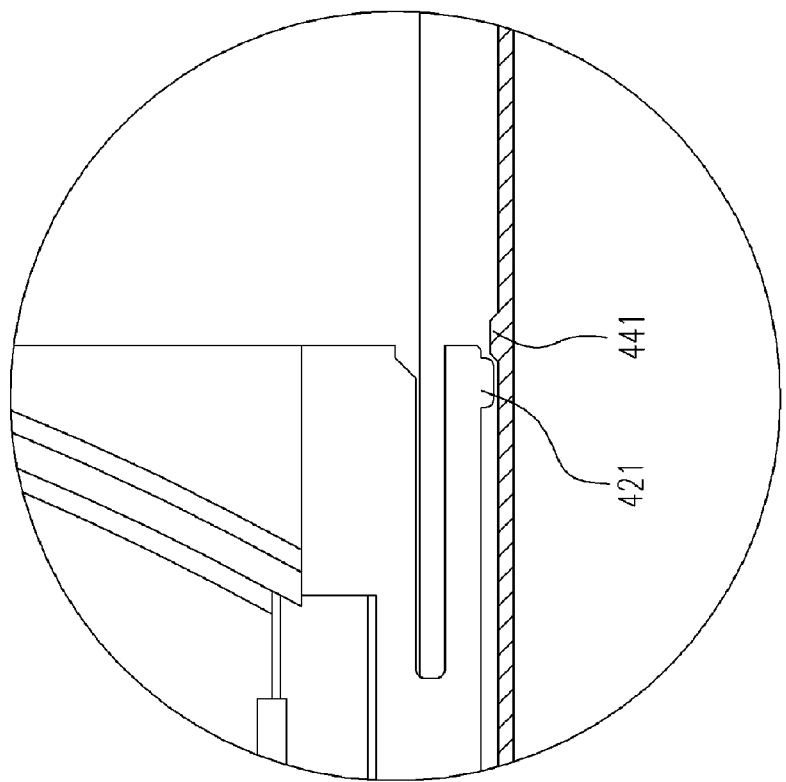
FIG. 8 is a top view showing the latching between the first positioning part and the second positioning part in the optical disc drive according to a third embodiment of the present invention.

FIG. 8 is a top view showing the latching between the first positioning part and the second positioning part in the optical disc drive according to a third embodiment of the present invention. As shown in FIG. 8, both the first positioning part 421 and the second positioning part 441 are protrusions. Since the size, location, shape, quantity of the aforementioned protrusion depends on product requirements, no special restrictions are laid down in these areas in the present invention.

As shown in FIGS. 3, 4 and 5, when there is a need to read the data in a particular optical disc, the optical disc is loaded on the tray 220 such that the center of the disc is firmly mounted on the turntable 231. Thereafter, the tray 220 is pushed into the casing 210 guided by the rail 240 such that the elastic first positioning part 221 is disengaged from the second positioning part 241. When the user initiate the reading operation, the turntable 231 will rotate the optical disc and then the optical pick-up 233 will move along a track-seeking path to read the data. As the optical pick-up 233 reads data from the optical disc, the control circuit board 250 also controls the operation of the turntable 231 and the optical pick-up 233 and receives the data signals from the optical pick-up 233 through the flexible printed circuit 260.

In summary, the present invention utilizes the latching of the first positioning part on the tray with the second positioning part on the rail to maintain a relative position between tray and the casing after the tray is withdrawn or ejected from the casing. Thus, the pull on the tray due to the bending and extension of the flexible printed circuit can be cancelled out. Consequently, the tray is fixed at a predetermined position to prevent any interference with the casing while the user loads or unloads optical disc on the tray.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disc drive suitable for reading data from an optical disc, comprising:
   a casing;
   a tray disposed inside the casing, wherein the tray has a first positioning part and is suitable for ejecting from the casing;
   a reading module disposed on the tray, wherein the reading module is suitable for reading the data in the optical disc; and
   a rail disposed inside the casing, wherein the rail is suitable for withdrawing away from the casing when driven by the tray, the rail has a second positioning part such that the relative position between the tray and the casing when the tray is ejected from the casing is maintained through the first positioning part and the second positioning part.

2. The optical disc drive of claim 1, wherein the first positioning part is a protrusion and the second positioning part is a recess or a hole.

3. The optical disc drive of claim 1, wherein the first positioning part is a recess or a hole and the second positioning part is a protrusion.

4. The optical disc drive of claim 1, wherein the first positioning part and the second positioning part are protrusions.

5. The optical disc drive of claim 1, wherein the optical disc drive further comprises:
   a control circuit board disposed inside the casing; and
   a flexible printed circuit for connecting the reading module with the control circuit board.

6. The optical disc drive of claim 1, wherein the reading module further comprises:
   a turntable disposed on the tray for gripping and spinning the optical disc; and
   an optical pick-up disposed on the tray suitable for moving along a track-seeking path to read the data from the optical disc.

7. The optical disc drive of claim 1, wherein the rail further comprises:
   an outer rail disposed inside the casing; and
   an inner rail forming a sliding engagement with the outer rail, wherein the tray forms a sliding engagement with the inner rail.

8. The optical disc drive of claim 1, wherein the tray has an arm such that the first positioning part is located on the arm.

* * * * *